July 10, 1945.　　　C. J. GUTHRIE　　　2,380,168
BLOOD TESTING APPARATUS
Filed Aug. 10, 1944　　　2 Sheets-Sheet 1

C. J. Guthrie
INVENTOR.

BY
ATTORNEYS.

July 10, 1945.  C. J. GUTHRIE  2,380,168
BLOOD TESTING APPARATUS
Filed Aug. 10, 1944   2 Sheets-Sheet 2
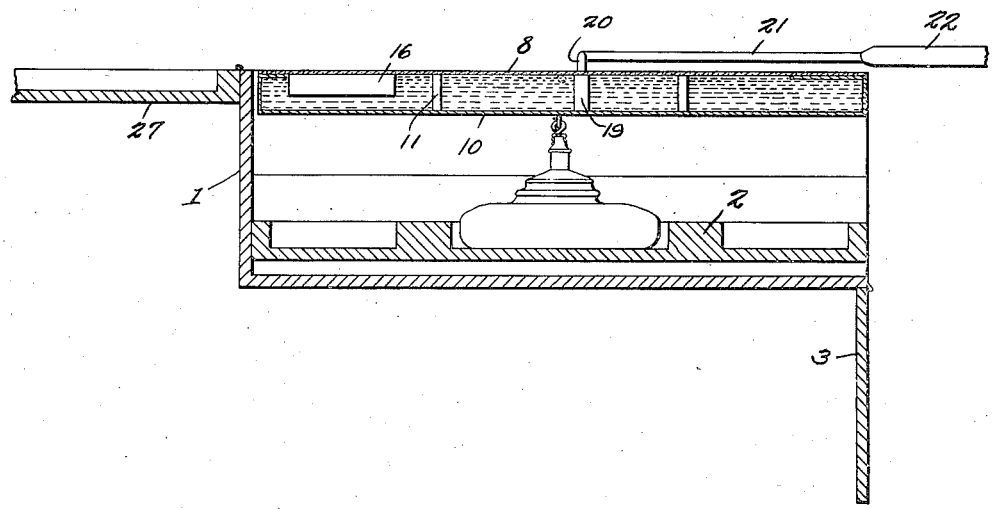
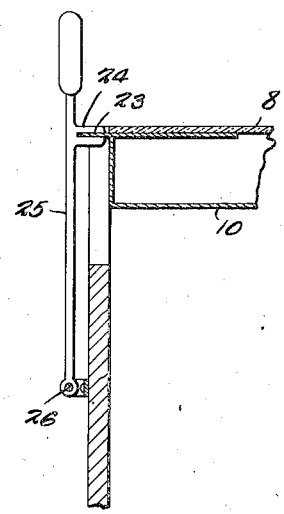
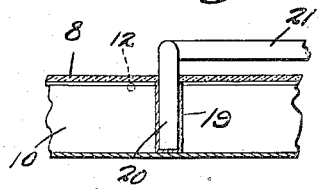
C. J. Guthrie
INVENTOR.
BY
*Knowles*
ATTORNEYS.

Patented July 10, 1945

2,380,168

UNITED STATES PATENT OFFICE 2,380,168

BLOOD TESTING APPARATUS

Cecil James Guthrie, Kansas City, Kans.

Application August 10, 1944, Serial No. 548,906

3 Claims. (Cl. 73—432)

This invention relates to blood testing apparatus and while it is designed primarily for use in testing for bacillary white diarrhea in the blood of poultry, it can be used for making any test where an even plate temperature is necessary.

It is a fact well known to those skilled in the art that various types of testing plates have been employed; some of these utilize a flame under the plate while others are heated electrically. It has been found that all plates thus heated have hot and cold spots with the result that in the hot areas the blood under test dries too quickly for an accurate reading whereas the cold areas prevent any reactors from showing up in the test although they would appear had the area been of proper temperature.

Plates used for blood tests have generally been held stationary during the testing operation but this has retarded the final results.

An object of the present invention is to provide a test plate forming a part of a container for holding hot water part of this container being extended throughout the active area of the plate so that all portions of the plate are maintained constantly at the same temperature.

A further object is to provide the plate with means for indicating the temperature so that the user can determine at all times whether or not it is necessary to heat the water to raise the temperature.

A still further object is to so mount the plate as to permit it to be tilted or rocked, it having been found in practice that this action speeds up the readings on the plate.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Fig. 3 is a section on line 3—3 Fig. 1.

Fig. 4 is an enlarged section on line 4—4 Fig. 1.

Fig. 5 is a section on line 5—5 Fig. 1, said section being enlarged.

Figure 1:
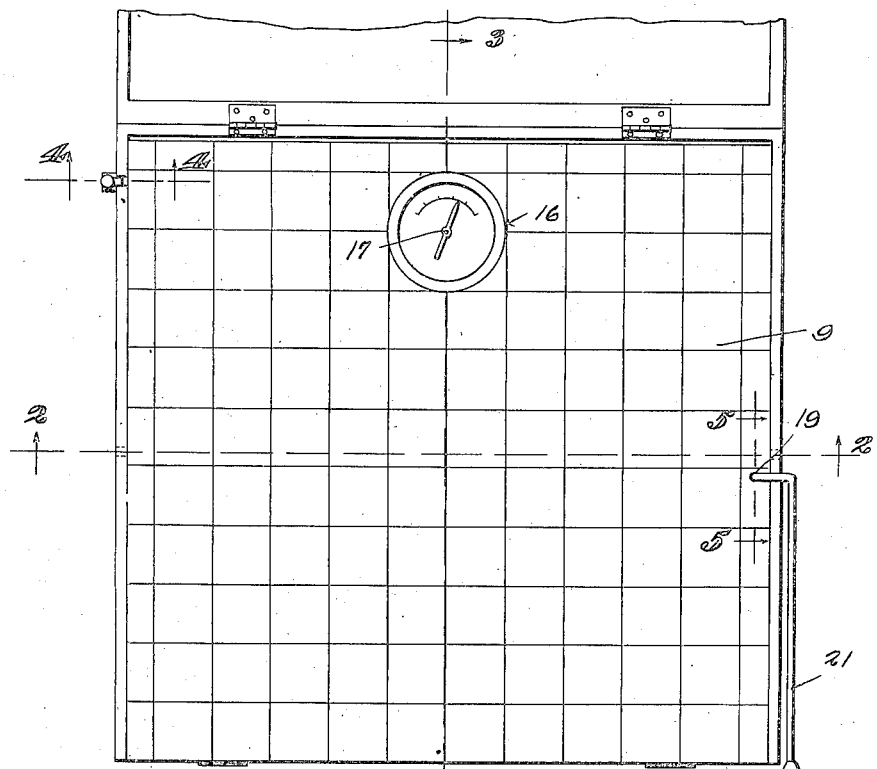
Fig. 1 is a top plan view of the structure, the cover or lid being in open position and broken away.

The present invention includes a casing 1 having a tray 2 which is adapted to be slid into and out of position through the open front of the casing, there being a hinged panel 3 which can be used for closing the open front of the casing but which, when lowered, as in Fig. 3, will allow the tray 2 to be withdrawn partly or entirely from the casing. The tray 2 has a recess 4 for receiving a small lamp 5 and it also has a bracket 6 on which is mounted a cup 7.

A porcelain test plate 8, the top surface of which can be laid off into separate areas by means of crossed lines 9, is proportioned to fit between the walls of the casing and the bottom of this plate is joined to the walls of a shallow tank 10 which can be reinforced wherever desired by means of tie pins 11 welded or otherwise joined to the bottom of the tank and to the bottom surface of the plate 8. The tank and the plate 8 are coextensive and oppositely extended gudgeons 12 are carried by the sides of the tank and supported within the side walls of the casing. Thus the tank and plate can be rocked about the axis of these gudgeons, this rocking movement being resisted normally by a constantly tensioned coiled spring 13 one end of which is secured to the bottom of the tank 10, as shown at 14, while the other end is secured to the inner side of the casing 1 as shown at 15. As the spring is constantly under tension it serves to maintain the tank and the plate normally level.

A well or recess 16 is provided in the test plate and extends into the tank, there being a thermometer 17 located therein whereby the temperature of the water $w$ in the tank 10 can be determined readily and accurately.

It is to be understood of course that preferably two springs 13 are provided, one located at each side of the structure. It is also necessary that a combined filling and drain opening be employed. This can be located wherever deemed most suitable and can be closed by a tight cap 18.

Formed in the plate near one side is a socket 19 adapted to receive a finger 20 extended at an angle from a lever 21 which can be provided with a handle 22. This finger is removable from the socket but when it is desired to rock the test plate and the tank, the finger is inserted into the socket and by gripping handle 22 the plate and tank can be rocked against the action of the springs 13, as will be obvious. When the lever is disconnected from the tank, however, the springs will return the plate 8 and the tank to their normal horizontal position.

A lip 23 is extended laterally from the tank at a point where it can be engaged by a fork 24 extended laterally from a locking lever 25. This lever is fulcrumed in a bracket 26 and can be shifted so as to place the fork 24 in engagement with or to disengage it from the lip 23. When the parts are in engagement with each other the plate 8 and the tank 10 are held fixedly against movement.

The plate 8 can be suitably marked to aid in making blood tests and the marking thereof constitutes no part of the present invention.

Figure 2:
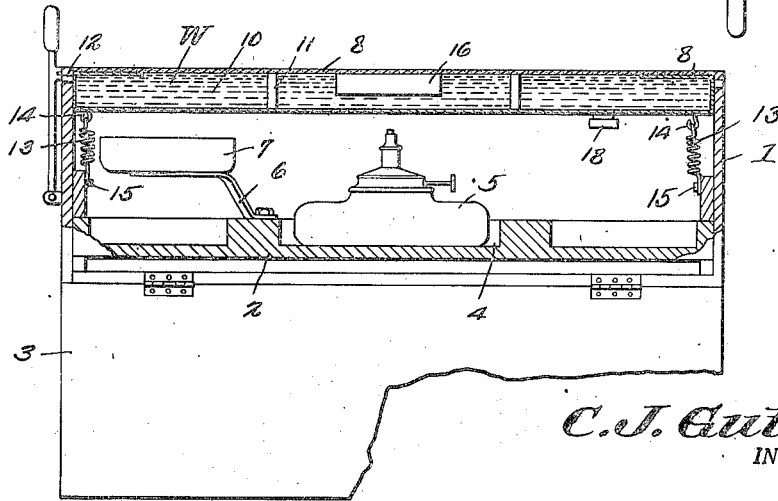
Fig. 2 is a front elevation of the lower portion of the structure, the upper portion being shown in section on line 2—2 Fig. 1.

When a test is to be made, the tank 10 is filled with water and the structure assembled as in Figs. 2 and 3. The tray 2 is partly withdrawn, alcohol is placed in the cup 7 and lighted, and said tray then moved back into position. The flame from the burning alcohol will quickly raise the temperature of the water $w$ and when the proper temperature has been reached, as determined by the thermometer, the small lamp 5 is lighted and placed in position where a small flame therefrom will maintain the water at the desired temperature. This can be controlled by increasing or reducing the size of the lamp flame. As only a single body of water is contained in the tank, the temperature of this water at the top will always be maintained the same due to a circulation which will be set up because of the heating action. As a result of this arrangement all parts of the plate will be kept at the same temperature and while a test is being made the plate can be unlocked from lever 25 and, by inserting lever 21 into engagement with the plate, said plate can be rocked back and forth to expedite the test.

When the apparatus is not in use the front panel 3 can be closed and a lid or cover 27 which is hingedly connected to the back of the casing 1, can be swung downwardly on to the top of the casing to conceal and protect the test plate.

What is claimed is:

1. A blood testing apparatus including a casing, a tank tiltably mounted in the casing, a test plate secured to and constituting the top of the tank, a thermometer carried by the test plate and supported within the tank, said tank constituting means for holding water, yielding means for maintaining the tank and test plate normally horizontal, means for maintaining the water at a predetermined temperature, and means for rocking the tank and plate against the action of said yielding means.

2. In a blood testing apparatus the combination with a casing and a heating element therein, of a tank pivotally mounted within the casing and above the heating element, a test plate joined to and constituting the top of the tank, said tank constituting means for holding water, yielding means for maintaining the tank and plate normally in a substantially horizontal position, a lever connected to the plate and constituting means for rocking said tank against the action of the yielding means, and means for holding the tank against movement.

3. Blood testing apparatus including a casing, a water tank pivotally mounted in the casing, a test plate joined to and constituting the top of the tank, tensioned springs connecting the tank and casing for maintaining the plate normally in a substantially horizontal position, and means extending from the plate for actuation by the user to rock the tank and plate against the action of the springs.

CECIL JAMES GUTHRIE.